(12) United States Patent
Fujino et al.

(10) Patent No.: US 6,427,738 B1
(45) Date of Patent: *Aug. 6, 2002

(54) TIRE AND VULCANIZED RUBBER INCLUDING ELONGATED CELLS

(75) Inventors: Kentaro Fujino; Hideki Matsui, both of Tokyo (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/097,597

(22) Filed: Jun. 16, 1998

(30) Foreign Application Priority Data

Jun. 18, 1997 (JP) .............................................. 9-161372

(51) Int. Cl.$^7$ .............................. B60C 1/00; B60C 11/00
(52) U.S. Cl. ................................ 152/209.4; 152/209.7; 428/313.5; 428/314.2; 428/314.8
(58) Field of Search ........................... 152/209.1, 209.5, 152/209.7, 209.15, 905, 209.4; 524/492, 493; 521/99, 131, 142, 143, 146, 148, 150; 428/308.4, 313.5, 314.2, 314.8, 316.6, 327

(56) References Cited

U.S. PATENT DOCUMENTS

| | | | | |
|---|---|---|---|---|
| 4,249,588 A | * | 2/1981 | Egan | |
| 4,675,349 A | * | 6/1987 | Palombo et al. | 152/209.5 |
| 5,176,765 A | * | 1/1993 | Yamaguchi et al. | 152/209.7 |
| 5,342,900 A | * | 8/1994 | Wolpers et al. | |
| 5,753,365 A | * | 5/1998 | Morimoto et al. | |
| 5,776,991 A | * | 7/1998 | Teratani | 521/99 |
| 5,788,786 A | * | 8/1998 | Yamauchi et al. | 152/209.7 |

FOREIGN PATENT DOCUMENTS

| | | | |
|---|---|---|---|
| EP | 517538 | * | 12/1992 |
| EP | 673792 | * | 9/1995 |
| EP | 0 734 886 | | 10/1996 |
| EP | 771836 | * | 5/1997 |
| EP | 0 826 522 A1 | | 3/1998 |
| JP | 4-110212 | * | 4/1992 |
| JP | 4-368205 | * | 12/1992 |
| WO | WO 97/34776 | * | 9/1997 |

* cited by examiner

Primary Examiner—Steven D. Maki
(74) Attorney, Agent, or Firm—Sughrue Mion, PLLC

(57) ABSTRACT

A vulcanized rubber comprising a rubber component containing natural rubber, in an amount of 20 to 70 parts by weight, and polybutadiene, in an amount of 30 to 80 parts by weight; a rubber matrix containing 5 to 55 parts by weight of carbon black and 5 to 55 parts by weight of silica per 100 parts per weight of the rubber component; a resin, and resin coated elongated cells having a length (L) to diameter (D) ratio (L/D) of at least 3. The vulcanized rubber can be used in the tread of tires to improve on-ice performance, wet properties and wear resistance in a well balanced manner.

10 Claims, 7 Drawing Sheets

TIRE AND VULCANIZED RUBBER INCLUDING ELONGATED CELLS

FIELD OF THE INVENTION

The present invention relates to a rubber composition, vulcanized rubber and to a tire. More specifically, it relates to a rubber composition which can be used as vulcanized rubber and a raw material of vulcanized rubber. This vulcanized rubber can be employed in tires and tire tread to improve the following characteristics in a well balance manner: cornering, braking and traction property on icy roads (on-ice performance), handling on wet roads (wet properties), and wear resistance on dry roads.

DESCRIPTION OF THE RELATED ART

Since the prohibition of spike tires, a deal of research into the tread of studless tires improving braking and driving performance on icy roads (on-ice performance) where films of water can often occur, has been carried out.

On icy surfaces, water films decrease the coefficient of friction between studless tires and the icy surface. Thus the ability of the tread of the studless tire to remove water film and the edge effect of the tread can effect on-ice performance of the studless tire drastically. Thus there is a need to improve the ability to remove water film and the edge effect.

Japanese Patent No. 2,568,502 discloses a technique where the tread of tires is made of foamed rubber, and independent cells in the foamed rubber cause fine bumps and pores which improve the ability to remove water film and the edge effect. However, use of foamed rubber containing only independent cells fails to provide a level of improvement in on-ice performance able to fully satisfy market demands.

Japanese Patent Application Laid-open (JP-A) No. 8-85738 discloses the use of rubber compositions having excellent hydrophobicity and water repellent properties. However, as in Japanese Patent No. 2,568,502, these techniques fail to provide on-ice properties of a level able to satisfy market demands.

On the other hand, methods using short fiber loaded foamed rubber in tire tread, and providing micro grooves in the surface of tire tread are disclosed in JP-A No. 4-38207.

However, the short fibers curl due to heat shrinkage, get squeezed, and contort in the tire treads by brades which make sipes in the tread during vulcanization. For this reason, even when tire-tread wears, the short fibers, which are not parallel to the plane of friction, are not easily removed from the tire-tread, and the expected microgrooves are not formed effectively, resulting in an insufficient increase in on-ice coefficient of friction. Also, the removal of the short fibers from the tire tread depends largely on traveling conditions and the like. Therefore improvements in on-ice performance cannot be achieved with certainty. Further, the microgrooves tend to collapse when tires are exposed to heavy loads. In this case there is also the further problem of serious reductions in wear resistance.

Also, a tire has been disclosed in JP-A No.4-110212 in which hollow fibers are dispersed in the tire tread. This enables the water formed between the icy surface and the contacting plane of the tire tread to be removed by the hollow section of the hollow fibers. However, the hollow fibers tend to collapse through pressure, rubber streaming, certain temperatures and the like applied at the time of formation when being kneaded with rubber. Therefore, the hollow fibers do not maintain their hollow configuration and the general problem of insufficient water removal persists. The problem of significant reductions in wear resistance is also seen in this case.

SUMMARY OF THE INVENTION

The object of the present invention is to solve the above problems.

The object of the present invention is to provide a tire which exhibits excellent ability to remove water formed between the tire and the icy surface, a high coefficient of friction with icy surfaces, and the ability to produce well balanced improvements in cornering, braking and traction property on icy roads (on-ice performance) and handling stability on wet roads (wet performance) and wear resistance on dry roads, without depending on traveling conditions.

The object of the present invention is to provide a vulcanized rubber suitable for use in a structure such as tread of the tire which can suppress slipping on ice.

Another object of the present invention is to provide a rubber composition suitable for use as a raw material for the vulcanized rubber and the tire.

After a deal of inquiry and investigation, the inventors of the present invention have made the following findings. On-ice properties are significantly improved when elongated cells are formed in the tread. However, in this case, wear resistance is significantly reduced when foamed rubber is used as the tread. This reduction in wear resistance can be suppressed if butadiene rubber is incorporated, but handling stability on wet roads (wet property) lowers. If silica is further incorporated, this reduction in the wet property can be suppressed. As a result, a method of maintaining on-ice performance, wet property, and wear resistance in a well balanced way has been realized.

The present invention is based on the findings by the inventors and the means taken to solve the above problems are as set out below.

1) vulcanized rubber comprising a rubber matrix and elongated cells, wherein said rubber matrix comprises i) a rubber component containing 20 to 70 parts by weight of natural rubber and 30 to 80 parts by weight of polybutadiene rubber, ii) 5 to 55 parts by weight of carbon black per 100 parts by weight of the rubber component, and iii) 5 to 55 parts by weight of silica per 100 parts by weight of the rubber component, and wherein said elongated cells are coated with a resin layer and have a ratio (L/D) of an average length (L) to average diameter (D) of at least 3.

2) The vulcanized rubber of 1) above in which the average foaming ratio is 3 to 40%.

3) A tire comprising:
   a pair of bead sections;
   a carcass which extends between the pair of bead sections and is formed in a toroidal shape;
   a belt which reinforces the crown of said carcass; and tread,
   wherein the tread contains the vulcanized rubber described in 1) or 2) above.

4) The tire described in 3) in which elongated cells are oriented along the circumferential direction of the tire.

5) A rubber composition comprising a rubber matrix and elongated resin,
   wherein said rubber matrix comprises i) a rubber component containing 20 to 70 parts by weight of natural rubber and 30 to 80 parts by weight of polybutadiene rubber, ii) 5 to 55 parts by weight of carbon black per 100 parts by weight of the rubber component, and iii)

5 to 55 parts by weight of silica per 100 parts by weight of the rubber component, and all of which becomes the vulcanized rubber described in 1) or 2) above through vulcanization.

6) The rubber composition described in 5) above wherein the rubber matrix contains a foaming agent, and wherein the viscosity of the elongated resin becomes lower than the viscosity of the rubber matrix before the temperature of the rubber composition reaches the maximum vulcanizing temperature during vulcanization.

7) The rubber composition described in 5) or 6) above wherein the elongated resin comprises a crystalline polymer having a melting point lower than the maximum vulcanizing temperature.

8) The rubber composition described in any one of 5) to 7) in which the melting point of the elongated resin is 190° C. or less.

DESCRIPTION OF THE PREFERRED EMBODIMENTS

Figure 1:
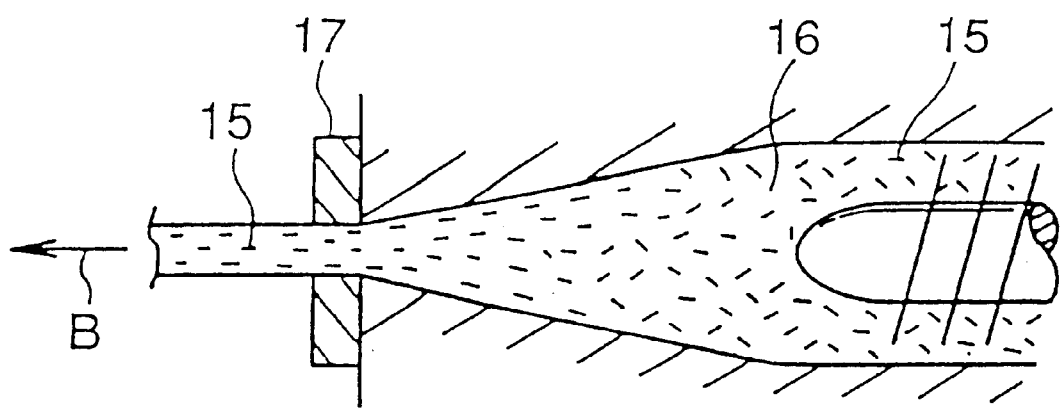
FIG. 1 is an explanatory view which explains the principle behind the arrangement of the elongated resin orientation.

Now the rubber composition, vulcanized rubber and tire of the present invention will be explained in detail.

Rubber Composition

The rubber composition of the present invention comprises a rubber matrix and an elongated resin. The rubber matrix contains a rubber component containing at least natural rubber and polybutadiene rubber; carbon black; and silica, and optionally other components such as a foaming agent, foaming auxiliary and a coupling agent, excluding the elongated resin in the rubber composition of the present invention.

Rubber Matrix

Rubber Component:

The above rubber component contains at least natural rubber and polybutadiene rubber. The polybutadiene rubber is not specifically limited, but cis-1,4-polybutadiene is preferable because it has a low glass transition temperature and exhibits effective on-ice performance. Polybutadiene having a cis content of 90% or more is especially preferable.

One type of polybutadiene rubber may be used alone or two or more types may be used in combination.

The amount of natural rubber in the rubber component is 20 to 70 parts, preferably 30 to 50 parts. The amount of polybutadiene rubber (BR) is 30 to 80 parts by weight, preferably 50 to 70 parts by weight.

In some embodiments of the present invention, the upper and lower limit of the amounts of the natural rubber or the polybutadiene rubber in the rubber component can be replaced with the value described in the later-mentioned examples.

When the amount of natural rubber in the rubber component is within the above-mentioned range, the resulting tires have improved breakdown properties such as resistance to block chipping and siping cracks as well as flexibility at low temperature. If the amount of the polybutadiene in the rubber component is within the above-mentioned range, the resulting tires have excellent properties such as flexibility at low temperature as well as resistance to breakdown and handling stability on wet roads (wet properties).

Carbon Black:

The type of carbon black is not limited, and commercial products can be suitably employed. Examples of commercial products may include carbon N220, carbon N234 and the like.

In the present invention, the so called high structured carbon black can be suitably employed. When compared to regular grade carbon black, this "high structured carbon black" has excellent wear resistance and is preferable because it can be easily oriented in the direction of extrusion at the time of extrusion of the rubber composition. One type of carbon black may be used alone, or two or more types may be used in combination.

The amount of the carbon black is 5 to 55 parts by weight, preferably 10 to 50 parts by weight, more preferably 20 to 40 parts by weight per 100 parts of the rubber composition.

In some embodiments of the present invention, the upper and lower value of the amount of the carbon black in the rubber component can be replaced with the value described in the later-mentioned examples.

When the amount of carbon black is within the above-mentioned range, the resultant vulcanized rubber has excellent properties in terms of wear resistance and wet properties as well as flexibility at low temperatures.

Silica:

There are no specific limitations on the type of silica used, and commercial products can be suitably used. Examples of commercial products may include Nipsil AQ (manufactured by Nippon Silica) and the like. A single type of silica may be used alone, or two or more types may be used in combination.

The amount of silica in the rubber composition is 5 to 55 parts by weight, preferably 30 to 50 parts by weight per 100 parts by weight of the rubber component.

In some embodiments of the present invention, the upper and lower value of the amount of silica can be replaced with the value described in the later-mentioned examples.

Preferably, the amounts of silica present in the rubber composition of the present invention may increase in proportion with parts by weight of polybutadiene (BR) present in 100 parts by weight of the rubber component. For example, if the proportion of polybutadiene (BR) is 50%, preferably the amount of silica may be at least 15 parts by weight, more preferably 30–55 parts by weight.

When the amount of silica is within the above-mentioned range, the resultant vulcanized rubber exhibits excellent wear resistance and wet properties as well as flexibility at low temperature.

Other Components:

Other components can be used as long as the object of the present invention is not hampered. Suitable selections can be made depending on the object. For example, vulcanizing agents such as sulfur, vulcanizing accelerators such as dibenzothiazyldisulfide, vulcanizing assistants, age resistors such as N-cyclohexyl-2-benzothiazylsulfenamide and N-oxydiethylene-benzothiazylsulfenamide, and other additives such as zinc oxide, stearic acid, anti-ozone-deteriorative agents, colorants, antistatic agents, dispersants, lubricants, antioxidants, softening agents, inorganic filling materials and compounding agents used in the rubber industry can be suitably selected.

Regarding other components in the present invention, commercial products can be suitably used.

Examples of inorganic filling materials may include $Al_2O_3$, ZnO, $TiO_2$, SiC, Si, C, $SiO_2$, ferrite, zirconia, MgO; metals such as Fe, Co, Al, Ca, Mg, Na, Cu, Cr; alloys composed of these metals, nitrides, oxides, hydroxides, carbonates, silicates, and sulfates of these metals, as well as brass, stainless steel, glass, carbon, carbon random, mica, zeolite, kaolin, asbestos, montmorillonite, bentonite, graphite, silica, clay, and the like. These can be used singularly or in combination thereof.

A foaming agent can be very preferably used as another component in the present invention. When a foaming agent is used, foamed rubber made of vulcanized rubber having a high proportion of foaming can be produced. It is also advantageous because the resin can be efficiently made into the resin having elongated cells therein.

Examples of the above foaming agent may include dinitrosopentamethylenetetraamine (DPT), azodicarbonamide (ADCA), dinitrosopentastyrenetetramine, and benzenesulfonylhydrazide derivatives, oxybisbenzenesulfonylhydrazide (OBSH), carbon dioxide releasing ammonium carbonate, nitrogen releasing nitrososulfonylazo compounds, N,N'-dimethyl-N,N'-dinitrosophthalamide, toluenesulfonylhydrazide, P-toluenesulfonylsemicarbazide, and P, P'-oxy-bis (benzenesulfonylsemicarbazide)

When productivity is taken into consideration, dinitrosopentamethylenetetraamine (DPT) and azodicarbonamide (ADCA) are preferable.

They may be used individually or in combinations. They can be selected suitably according to the vulcanizing temperature and the like.

It is preferable in the present invention to use a foaming assistant in concert with a foaming agent in order to carry out the foaming process efficiently.

Examples of foaming assistants may include urea, zinc stearate, zinc benzenesulfinate, zinc oxide and others commonly used in the manufacture of foam products. Urea, zinc stearate, zinc benzenesulfinate and the like are preferable. They may be used individually or in combinations.

Of the other components listed above, a coupling agent is preferably used in the present invention. If the coupling agent is used, the carbon black and the silica are surface treated by the coupling agent. The rubber components, the silica, and the carbon black can be bonded through the pores on the surfaces of the carbon black and the silica; not just physically, but also chemically. The coupling agents provide stronger bonding and overcomes problems such as the carbon black and silica being separated from the rubber matrix, resulting in excellent tread wear resistance.

There are no specific limitations on the coupling agent, and selections suited to objectives can be made. However, a typical silane coupling agent like Si69 (manufactured by DEGUSSA) for example, is preferable.

Examples of other silane coupling agents may include
bis(3-triethoxysilylpropyl)tetrasulfide,
bis(2-1triethoxysilylethyl)tetrasulfide,
bis(3-trimethoxysilylpropyl)tetrasulfide,
bis(2-trimethoxysilylethyl)tetrasulfide,
3-mercaptopropyltrimethoxysilane,
3-mercaptopropyltriethoxysilane,
2-mercaptoethyltrimethoxysilane,
3-nitropropyltrimethoxysilane,
3-nitropropyltriethoxysilane,
3-chloropropyltrimethoxysilane,
3-chloropropyltriethoxysilane,
2-chloroethyltrimethoxysilane,
2-chloroethyltriethoxysilane, 3-trimethoxysilylpropyl-N, N'-dimethylthiocarbamoyltetrasulfide,
3-triethoxysilylpropyl-N,N'-dimethylthiocarbamoyltetrasulfide,
2-triethoxysilylethyl-N,N-dimethylthiocarbamoyltetrasulfide,
3-trimethoxysilylpropylbenzothiazoletetrasulfide,
3-triethoxysilylpropylbenzothiazoletetrasulfide,
3-triethoxysilylpropylmethacrylatemonosulfide, and
3-trimthoxysilylpropylmethacrylayemonosulfide.

Of these, bis(3-triethoxysilylpropyl)tetrasulfide, 3-trimethoxysilylpropylbenzothiazoletetrasulfide and the like are preferable.

They may be used individually, or in combinations.

The amount of coupling agent contained in the rubber composition may be 5 to 25% by weight, more preferably 10 to 25% by weight based on the of inorganic filler including the carbon black and silica.

When the amount of the coupling agent in the rubber composition is within the above mentioned range, the improvement in dispersion and the reinforcing effects of the carbon black and inorganic filler containing the silica in the rubber component are satisfactory. When the resulting rubber is then vulcanized and used in tire tread and the like, improvements in wear resistance and on-ice performance are satisfactory.

Resins

The viscosity of the elongated resin contained in the rubber composition may become lower than the viscosity of the rubber matrix before the temperature of the rubber composition reaches the maximum vulcanizing temperature.

The maximum vulcanizing temperature means the maximum temperature of the rubber attained at the time the rubber composition containing the elongated resin is vulcanized. For example, in the case of mold vulcanization, it means the maximum temperature reached between the insertion of the rubber composition into the mold and its removal followed by cooling.

The maximum vulcanizing temperature can be determined by such methods as, for example, embedding a thermocouple into the rubber composition.

The viscosity of the rubber matrix means the flow viscosity, and can be determined with a cone rheometer, a capillary rheometer and the like. The viscosity of the elongated resin means the melting viscosity, and can be determined with a cone rheometer, a capillary rheometer and the like.

There are no specific limitations placed on the raw resin materials of the elongated resin so long as they have the above heat properties. Suitable selections can be made in accordance with the object of the present invention. Raw materials for resins having the heat properties may be resins composed of crystalline polymers with melting points lower than the maximum vulcanizing temperature. Resins having melting points below 190° C. may be preferable.

The elongated resin composed of crystalline polymers will now be explained by way of example. The greater the difference between the melting point and the maximum vulcanizing temperature of the rubber composition containing the elongated resin, the sooner the phase of the elongated resin melts during vulcanization, and the sooner the viscosity of the phase portion of the elongated resin becomes lower than the viscosity of the rubber matrix. After the phase of the elongated resin melts, gas and the like released by foaming agents migrates to the inside of the phase of the elongated resin having a lower viscosity than the rubber matrix. As a result, elongated foam coated and formed by the elongated resin during vulcanization is abundant.

If the melting point of the elongated resin is too close to the maximum vulcanizing temperature of the elongated resin, on the other hand, the phase of the elongated resin does not melt at an early stage of vulcanization. At the final stage of vulcanization, the phase of the elongated resin begins to melt and gas released from the foaming agent gets incorporated into the vulcanized rubber matrix. Therefore, gas is not well retained inside the phase of the melted elongated resin.

If the melting point of the elongated resin is too low, it melts with the heat applied when the rubber composition is kneaded. As a result, there may be caused problem that melting of the phases of the elongated resin at the kneading stage leads to poor dispersion, that the phases can break up into a plurality of phases at the kneading stage, or that the phases melt into the rubber composition and undergo fine dispersion. These and other such inconveniences make very low melting point elongated resins undesirable.

Thus it is preferable to select an elongated resin with the above points regarding the melting point in mind. Normally it is preferable to select an elongated resin with a melting point at least 10° C. lower than the maximum vulcanization temperature of the rubber composition containing the elongated resin, or more preferably 20° C. lower.

A maximum vulcanization-temperature of the rubber composition is generally around 190° C. in industry. In a case where the maximum vulcanization temperature is set at 190° C., for instance, a resin melting point lower than 190° C. would normally be selected, preferably lower than 180° C. and more preferably lower than 170° C. .

Also, when taking the kneading process of the rubber composition into account, the melting point of the elongated resin should preferably be at least 5° C., more preferably at least 10° C., and most preferable at least 20° C. above the maximum temperature attained during the kneading process.

Now, if the maximum temperature upon kneading the rubber composition is 95° C., the melting point of the elongated resin would probably be at least 100° C., more preferably at least 105° C., and most preferably 115° C.

In the present invention, such melting points can be determined through the use of known melting point measuring instruments. For example, the peak melting temperature can be taken with a Differential Scanning Calorimeter (DSC) and regarded as the melting point.

The elongated resin may be composed of crystalline, amorphous or both crystalline and amorphous polymers. It is preferable to use organic materials containing crystalline polymers in the present invention, since precipitous changes in viscosity hereof occur at certain temperatures due to phase transition and thus the viscosity of resins can be controlled easily. Resins composed of all crystalline polymers are more preferable.

Specific examples of the crystalline polymers may include polyethylene (PE), polypropylene (PP), polybutylene, polybutylenesuccinate, polyethylenesuccinate, syndiotactic-1,2-polybutadiene (SPB and other single composition polymers, copolymers, blends and the like) which enable melting points to be set within suitable scopes. It is also possible to incorporate additives into these elongated resins.

Of these crystalline polymers, polyolefin and polyolefin-copolymers are preferable. Also, polyethylene and polypropylene are preferable because they are widely used and readily available.

Examples of the amorphous polymers may include polymethylmethacrylate, acrylonitrile-butadiene-styrene copolymer (ABS), polystyrene, polyethylene, NRs, SPB, PMMA, PAN, and copolymers and blends thereof.

Known additives can be used in the elongated resin if necessary, but at a level benign to the objectives of the present invention.

The molecular weight of the organic material in the elongated resin depends on the state of the branching and the chemical structure of the organic materials. There are no specific limitations as long as they are in a range benign to thermal properties. Generally, even if the elongated resin is composed of the same organic material, the greater the molecular weight is, the higher the viscosity is (melting viscosity) at a predetermined temperature. As a result, the molecular weight of the organic material of the elongated resin of the present invention should be selected from a range at which the viscosity of the phase of the elongated resin (melting viscosity) does not exceed the viscosity (flow viscosity) of the rubber composition containing the elongated resin at the maximum vulcanization temperature.

In an experiment, the elongated resin polyethylene having a weight average molecular weight of $1-2 \times 10^5$ led to a greater amount of gas being contained inside the phase of the elongated resin after vulcanization than did polyethylene having a weight average molecular weight of $7 \times 10^5$. It is assumed that the difference in molecular weights of raw materials of the elongated resins, i.e. polyethylene, leads to the difference in viscosity (melting viscosity).

On the other hand, if the molecular weight of the organic raw material in the elongated resin is too low, the viscosity of the phase of the elongated resin (melting resin), drops when the rubber composition containing the elongated resin is kneaded. This leads to undesirable melting between the phases of elongated resins and an undesirable deterioration in dispersion of the elongated resin phase in the rubber composition.

The configuration of the raw material resin of the elongated resin may be elongated, spherical or powdered. There are no specific limitations so long as an elongated resin phase can eventually be formed in the rubber composition as a result of extrusion. Suitable selections can be made according to objectives.

In the present invention, one individual configuration may be selected or 2 or more may be selected.

When elongated configurations of the raw material resins are selected, all conditions are selected to maintain the configuration, and to form the elongated resin phase in the rubber composition during kneading, warming and extrusion. Elongated raw material resins can be suitably used in the present invention because of easier controlling of the extrusion conditions.

When selecting spherical, powdered, or other configurations for the raw material resin, the conditions during kneading, warming, extrusion and the like are selected so that eventually the elongated resin phase is formed in the rubber composition, for example, by way of the following manner.

When the raw material resin is granular etc. prior to kneading the rubber composition, the granular resin can be flux-dispersed in the kneading compound at the time of kneading the rubber composition. The kneading temperature, duration and other such parameters can be selectively controlled until resin granules have an average diameter of about 20–400 μm. After this, extrusion and the like is carried out at a temperature above the melting point of the granular resin of the resultant kneading compound. As a result, through change of the configuration of the granular resin, the granular resin of the rubber composition after the kneading process can be made into a phase of elongated resin.

When the raw material resin is powdered before the rubber composition is kneaded, and for example, when the average diameter of the powdered resin is 20–400 μm, it is not necessary to flux-disperse the powdered resin into the kneading compound when kneading all the components of the rubber composition. The powdered resin can be dispersed with all the components of the rubber composition at a temperature below the melting point of the powdered resin, and after kneading, extrusion of the resultant kneading compound can be carried out at a temperature above the melting point of the powdered resin. Through change of the configuration of the substantially spherical, powdered resin, the powdered resin can be made into a phase of the elongated resin after the kneading process.

The fineness of the phase of the elongated resin formed in the rubber composition is not particularly specified, and suitable selections can be made in accordance with objectives. However, from the viewpoint of improving on-ice performance, a fineness of 1–1000 deniers is preferable. A fineness of 2–800 deniers is more preferable.

The average length (L) of the phase of the elongated resin is not particularly specified, and suitable selections can be made in accordance with objectives. From the viewpoint of improving the on-ice performance of tires, vulcanized rubber made from vulcanizing the rubber composition and used in the tread should preferably have an average length (L) of at least 500 μm. An average length of 500–5000 μm is more preferable.

When the average length (L) is not less than 500 μm, the desired elongated cells in the vulcanized rubber obtained through vulcanizing the rubber composition, are obtained.

The average length (L) of the phase of the elongated resin, can be calculated by, for example, microscopy.

The average diameter (D) of the phase of the elongated resin is not particularly specified, and can be suitably selected in accordance with objectives. From the viewpoint of improving on-ice performance of tires, however, an average diameter (D) of 30–500 μm is preferable, and an average diameter (D) of 50–200 μm is more preferable.

When the average diameter (D) is not less than 30 μm, drainage ability of the vulcanized rubber is satisfactory. When the average diameter is not more than 500 μm, the wear resistance of the vulcanized rubber does not decrease.

The average diameter (D) of the phase of the elongated resin, can be calculated by, for example, microscopy.

The ratio (L/D) of the average length (L) to the average diameter (D) is preferably at least 3.0, and more preferably 5 to 100.

When this ratio (L/D) is at least 3.0, the desired elongated cells and adequate icy-road performance as well as wear resistance are obtained in the vulcanized rubber.

The amount of the elongated resin in the rubber composition may be 0.5 to 20 parts by weight, more preferably 1.0 to 15 parts by weight, most preferably 1.0 to 10 parts by weight per 100 parts by weight of the rubber matrix.

In some embodiment of the present invention, the lower or upper limit values of the amount of the elongated resin may be replaced with the value described in the later-mentioned examples.

When the content amount is at least 0.5 parts by weight, the amount of gas held, or incorporated in the phase of the elongated resin is sufficient, and the resultant vulcanized rubber adequately improves on-ice performance when used in the tread of tires. Also, if not more than 20 parts by weight are included, elongated resins are uniformly dispersed in the rubber composition with increased workability at the time of rubber extrusion, and decreased cracks in the tread.

Preparation of the Rubber Composition

The rubber composition of the present invention can be adjusted through appropriate kneading, warming, and extrusion of the above components. Through the extrusion, the phase of the elongated resin in the rubber component is oriented in a direction substantially parallel to the direction of extrusion.

Conditions of the kneading process such as the volume fed into the kneading apparatus, the rotational speed of the rotor, the ram pressure, the kneading temperature, the kneading duration, the type of kneading apparatus and other such conditions may be selected suitably in accordance with demands.

Commercial apparatus can be used favorably as the kneading apparatus. Examples thereof may include the Banburry mixer, the Intermix, the Kneader and others used in the kneading of conventional rubber compositions for tires.

Warming conditions such as the warming temperature, or the duration of warming, the warming apparatus and other such factors may be selected suitably in accordance with demands. Commercially produced rollers used in warming conventional rubber compositions for tires, for example, can be employed.

Extrusion conditions such as the duration of extrusion, the speed of extrusion, the extrusion apparatus and other such factors can be selected suitably in accordance with demands. Commercially produced extrusion apparatus used in the extrusion of conventional rubber compositions for tires, for example, may be favorably used.

As a result of extrusion in the rubber composition of the present invention, the phase of the elongated resin is arranged in a direction substantially parallel to the direction of extrusion. In order to achieve the arrangement effectively, the flowability of the rubber matrix may be controlled within a limited temperature range. More specifically, the viscosity of the rubber matrix can be reduced through the suitable addition of plasticizers such as aromatic oils, naphthene oils, paraffin oils,. ester oils and the like, and liquid polymeric workability improving agents such as liquid polyisoprene, liquid rubber butadiene and the like. Increased flowability thereby provides, excellent extrusion, and the phase of the elongated resin can be arranged ideally in a direction substantially parallel to the direction of extrusion.

Use of the resultant vulcanized rubber, which is made from the rubber composition containing the elongated resin arranged in the above-mentioned manner, in the tread and the like of tires, increases drainage in the direction of motion, and improves on-ice performance, preferably when used in a state where the phase of the elongated resin is oriented in a direction parallel to the surface of the tread etc.

in contact with the road, more preferably in the circumferential direction of the tire.

Known methods can be employed to orient the phase of the elongated resin in a specific direction within the rubber composition. For example, FIG. 1 shows a method in which the rubber matrix 16 containing the phase of the elongated resin 15 is extruded from a mouthpiece 17 of an extruder in which the cross sectional area of a nozzle decreases toward the exit.

In this case, the longitudinal direction of the phase of the elongated resin in the rubber matrix 16 gradually becomes oriented uniformly along the extrusion direction (direction of arrow B) in the process of being carried to the mouthpiece 17. When being extruded from the mouthpiece 17 the longitudinal direction becomes oriented almost perfectly in the direction of extrusion (direction of arrow B). The degree of orientation of the phase of the elongated resin 15 in the rubber matrix 16 varies according to the level of reduction of the nozzle cross-sectional area, the rate of extrusion, the viscosity of the rubber matrix and the like.

Also, the relationship between the average length (L) of the phase of the elongated resin and the average diameter (D) is inversely proportional and can be regulated through suitable adjustments in the extrusion temperature, the rate of extrusion and the like.

In other words, by means of making the viscosity of the phase of the elongated resin reduced, by setting the extrusion temperature far above the melting point of the elongated resin raw material resin, and by means of setting the rate of extrusion increased, the average diameter of the phase of the elongated resin (D) can be made smaller (finer) and the average length (L) can be increased. Thus, the (L) to (D) ratio (L/D) can be made greater.

Thus, depending on the desired dimensions of the phase of the elongated resin (average length (L) and average width(D)), 1) the extrusion temperature, 2) the rate of extrusion, 3) the granule size at the early stage of dispersion are set and as a result 4) the kneading conditions such as the maximum kneading temperature and the number of times of kneading are set. Through suitable manipulation of these conditions, a variety of phases (from phases of elongated resins having small diameters with small (L/D) ratios, to phases of elongated resins having large (L/D) ratios) can be desirably produced.

In the rubber composition of the present invention, the viscosity of the phase of the elongated resin is higher than that of the rubber matrix prior to vulcanization. Upon initiation of vulcanization, the viscosity of the rubber matrix contained in the rubber composition increases due to vulcanization before the rubber composition reaches its maximum vulcanization temperature. On the other hand, the viscosity of the phase of the elongated resin contained in the rubber composition decreases greatly due to melting. Then, during vulcanization, the viscosity of the phase of the elongated resin turns lower than that of the rubber matrix.

In other words, there is a phenomenon where the viscosity relationship between the rubber matrix and the phase of the elongated resin prior to vulcanization becomes reversed at a vulcanization stage. During vulcanization, if foaming agents are used in the rubber composition, efficient foaming and gas production is seen. The gas produced by the foam migrates and is easily incorporated into the phase of the melted elongated resin which has a relatively reduced viscosity in comparison with the rubber matrix, whose viscosity increases as the vulcanization reaction proceeds.

As a result, in the resultant vulcanized rubber of the rubber composition, elongated cells exist where the phase of the elongated resin of the rubber composition existed. The surrounding area (elongated cell forming wall) facing elongated cells consists of and is coated by the raw material resin of the phase of the elongated resin. The elongated cells exist independently one another in the vulcanized rubber.

Also, in the case where the raw material resin of the phase of the elongated resin is polyethylene, polypropylene, etc., the coating layer (to be called 'the protective layer' below) comprising vulcanized rubber and the raw material resin of the phase of the elongated resin bind firmly. When the foaming agent is used, vulcanized rubber with a high proportion of foaming is obtained.

Also, in the vulcanized rubber of the present invention, the adhesive force between the raw material resin of the phase of the elongated resin and the vulcanized rubber matrix can be adjusted through the addition of suitably selected additives to the rubber composition before vulcanization.

The rubber composition of the present invention can be suitably used in a variety of fields, and can be very suitably used as a raw material of the vulcanized rubber of the present invention described below.

Vulcanized Rubber

The vulcanized rubber of the present invention containing the elongated cells can be produced through vulcanization of the rubber composition of the present invention. Thus, the vulcanized rubber of the present invention contains the elogated cells and the above-mentioned rubber matrix.

When the vulcanized rubber of the present invention is used in tread of tires described hereinafter and the like, it is preferable to orient the phase of the elongated resin, which is in the rubber composition of the present invention as a raw material, in a prescribed direction prior to vulcanization.

When orienting the elongated cells in a direction parallel to the surface of the tread and the like in contact with the road surface, or further, in the circumferential direction of the tire, fine drainage channels formed through the elongated cells are exposed in the surface of the tire. These drainage channels provide ability to remove water film and the edge effect, resulting in increased drainage and enhanced on-ice performance.

In order to orient the elongated cells in a prescribed direction in the vulcanized rubber, the phase of the elongated resin may be oriented in a prescribed direction in the rubber composition. Known methods may be employed in this (see, for example, FIG. 1).

There are no particular limitations to the vulcanizing apparatus or methodology. They can be suitably selected in accordance with demands. Specific examples of the vulcanizing apparatus include mold using vulcanizing machines and the like used conventionally when vulcanizing rubber compositions for tires.

In the vulcanized rubber matrix of the vulcanized rubber of the present invention, elongated cells including gas exist in the melted elongated resin.

Figure 2:
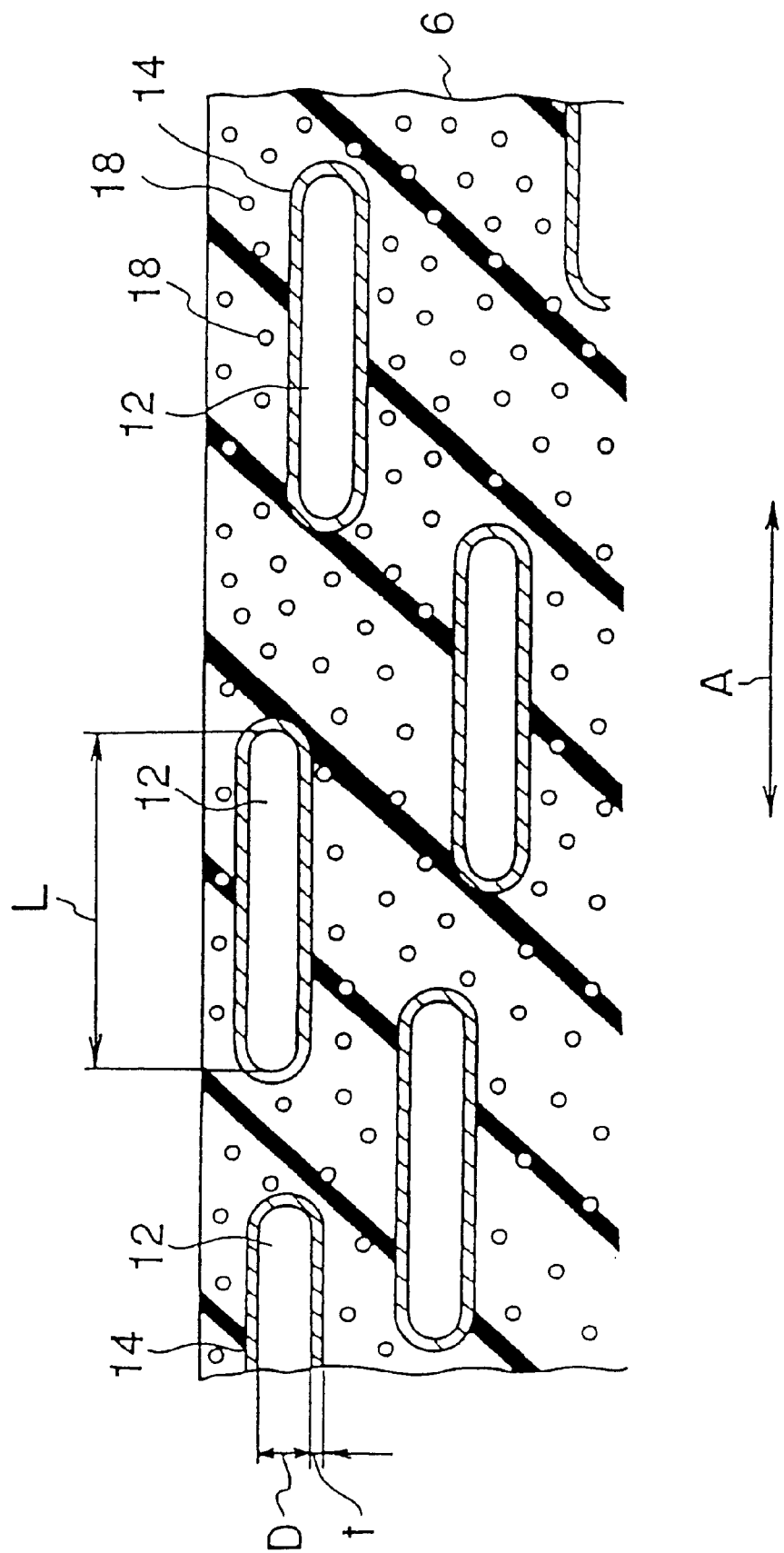
FIG. 2 is a cross sectional schematic explanatory view of the vulcanized rubber of the present invention.

When the phase of the elongated resin in the rubber composition is oriented in one direction through extrusion and the like of the rubber composition of the present invention, the elongated cells 12 are oriented in the direction of the vulcanized rubber as shown in FIG. 2.

These elongated cells 12 are surrounded by a protective layer consisting of the phase of the melted elongated resin adhered to the cross-linked rubber matrix. Thus, the elongated cells 12 exist as isolated spaces in the vulcanized rubber, and the gas released from the foaming agent is incorporated into the elongated cells 12.

As can be seen from FIG. 2, the gas released from the foaming agent in the rubber matrix exists also as spherical bubbles 18.

When the vulcanized rubber of the present invention is employed, for example, in the tread and the like of tires, the elongated cells 12 and the spherical cells 18 exposed from the surface function as drainage channels to drain off water efficiently.

Also, because the elongated cells 12 are surrounded by a protective layer 14 with excellent peeling resistance, the vulcanized rubber of the present invention containing the elongated cells 12, demonstrates particularly superior channel configuration maintenance, channel edge section wear resistance, and channel maintenance at the time of load applied.

There are no particular specifications to the average length (L) (see FIG. 2) of individual elongated cells 12 which are composed of the altered phase of the elongated resin in the vulcanized rubber of the present invention. Suitable selections may be made in accordance with demands. From the viewpoint of improving on-ice performance of tires in whose tread and the like the vulcanized rubber is used, the average length (L) is preferably at least 500 μm, more preferably 500–5000 μm.

If the average length (L) is within the range, the desired elongated cells are obtained in the vulcanized rubber with increased drainage properties when the vulcanized rubber is used in the tread of tires and the like.

There are no specific limitations to the average diameter (D) of individual elongated cells 12 composed of the altered phase of the elongated resin in the vulcanized rubber of the present invention. Suitable selections can be made in accordance with demands, but from the viewpoint of improvements in on-ice tire performance, 30–500μm is preferable; 50–200 μm is more preferable.

The ratio (L/D) of the average length (L) (see FIG. 2) to the average diameter (D) may be at least 3, preferably 5 or more.

There is no particular limit to this (L/D) ratio, but a figure of around 100 is selected.

The lower limit or upper limit values of the ratio (L/D) in the present invention can be replaced with the values used in the Examples below.

The average diameter (=interior diameter of protective layer 14, see FIG. 2) of the elongated cells in the vulcanized rubber of the present invention is preferably 30 to 500 μm.

If the average diameter (D) is within the range, the resulting tires have excellent properties such as resistance to cutting and block chippings, and wear resistance on dry roads.

From the viewpoint of on-ice performance and wear resistance, the average foaming ratio Vs in the vulcanized rubber of the present invention is preferably 3–40%, more preferably 5–35%.

The upper or lower limit values of the average foaming ratio Vs in the present invention can be replaced with the value described in the Examples below.

The average foaming ratio Vs, is represented by the total of the foaming ratio Vs1 of the spherical cells and the foaming ratio Vs2 of the elongated cells 12. This value is calculated through the following formula:

$$Vs = (\rho_0/\rho_1 - 1) \times 100 \ (\%)$$

wherein $\rho_1$ represents the density (g/cm$^3$) of the vulcanized rubber (foamed rubber), $\rho_0$ represents the density (g/cm$^3$) of the solid phase sections in the vulcanized rubber (foamed rubber).

The density of the vulcanized rubber (foamed rubber), and the density of the solid phase sections in the vulcanized rubber (foamed rubber) can be calculated by, for example determining their weights in ethanol and in air.

If the average foaming ratio Vs is not less than 3%, satisfactory drainage is obtained because of the absolute bump surface area to the films of water formed. Also, improvements in the effectiveness of on-ice performance can be expected. On the other hand, if Vs is not more than 40%, the effect of improving on-ice performance is adequate, and the cells in the vulcanized rubber are adequate, with an excellent breaking limit and durability of the compound.

The average foaming ratio can be altered favorably through the type of foaming agent, the amount, the types of foaming additives combined, the amounts, the resin mixture amounts, and the like, used.

It is preferable in the present invention that while the average foaming ratio Vs is 3–40%, the elongated cells comprise at least 10% of the average foaming ratio Vs. If this proportion is not less than 10%, suitable drainage channels through the elongated foam can be achieved with adequate drainability.

The elongated cells 12 in the vulcanized rubber are surrounded by the protective layer 14 comprising the phase of the melted elongated resin 15 which is adhered to the cross-linked rubber matrix. The thickness of the protective layer 14 is preferably 0.5–50 μm.

If the thickness of the protective layer 14 is not less than 0.5 μm thick, satisfactory improvements in on-ice performance are achieved with maintenance of drainage channel configuration. If not more than 50 μm thick, the actual drainage volume of the elongated cells is adequate, with excellent on-ice performance.

The vulcanized rubber of the present invention can be used suitably in a variety of fields, more preferably in products which need to have the ability to reduce on-ice slip. It can be used most preferably in the tread of tires and the like.

Examples of products in which on-ice slip reduction is necessary may include the substitutable tread of recapped tires, solid tires, the ground-contact parts of rubber chains for icy road travel, snow vehicle crawlers, shoes soles, belts, casters and the like.

Tires

The tire of the present invention comprises at least tread. As long as it contains at least the vulcanized rubber of the present invention, there are no specific limitations upon other components, but suitable selections may be made in accordance with demands. In other words, the tire of the present invention is one whose tread is formed of a vulcanized rubber made from the rubber composition of the present invention.

The tire of the present invention will be described with referring to the attached drawings. This example refers to tire tread (tread of pneumatic tires) in which rubber obtained from vulcanizing the above rubber composition is used.

Figure 3:
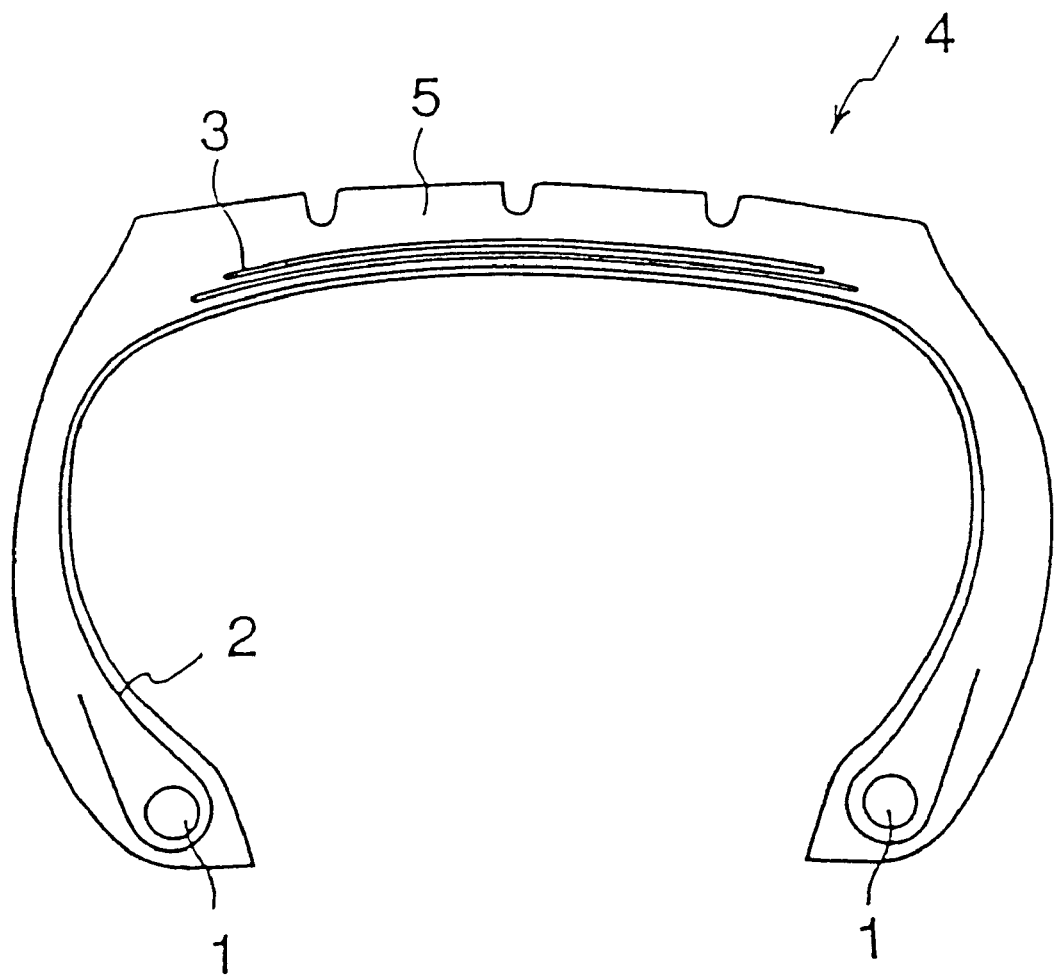
FIG. 3 is a cross sectional schematic explanatory view of a section of tire of the present invention.

As in FIG. 3., tire 4 (size: 185/70R13) is made up of a pair of bead sections 1, a carcass 2 which extends between a pair of bead sections 1 and is formed in a toroidal shape, a belt 3 which tightens the crown section of the carcass 2, and the tread 5 disposed orderly as a radial structure. In addition, apart from the tread 5, the interior structure is similar to the structure of conventional radial tires, so further explanation is omitted.

A plurality of blocks 10 are formed in the tread 5 (FIG. 4) by a plurality of circumferential grooves and a plurality of lateral grooves crossing the circumferential grooves. Also, sipes 11 are formed extending across the width direction of the tire for the purpose of enhancing on-ice braking performance, and traction properties.

The tread 5 (FIG. 5) is composed of the so-called cap-base structure: cap section 6 which makes direct contact with the road surface, and a base section 7 which is disposed directly next to the inner side of the cap section 6.

The cap section 6 (FIGS. 2 & 7) is a foamed rubber containing uncountable spherical cells 18, and elongated cells 12. Conventional unfoamed rubber is used in the base section 7. The foamed rubber may be the vulcanized rubber of the present invention.

Figure 4:
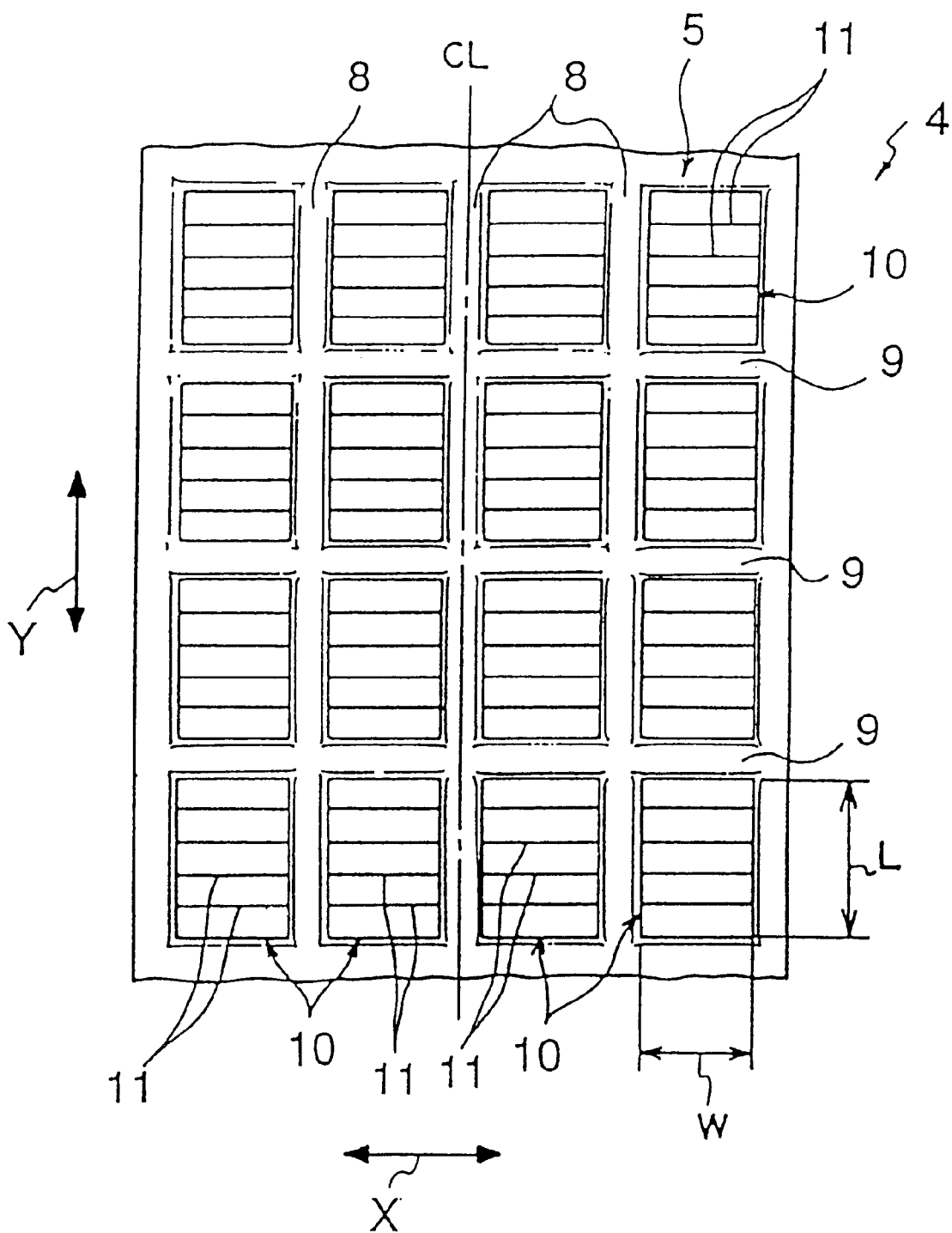
FIG. 4 is a cross sectional schematic explanatory view of a section of the contact surface of the tire of the present invention.
Figure 5:
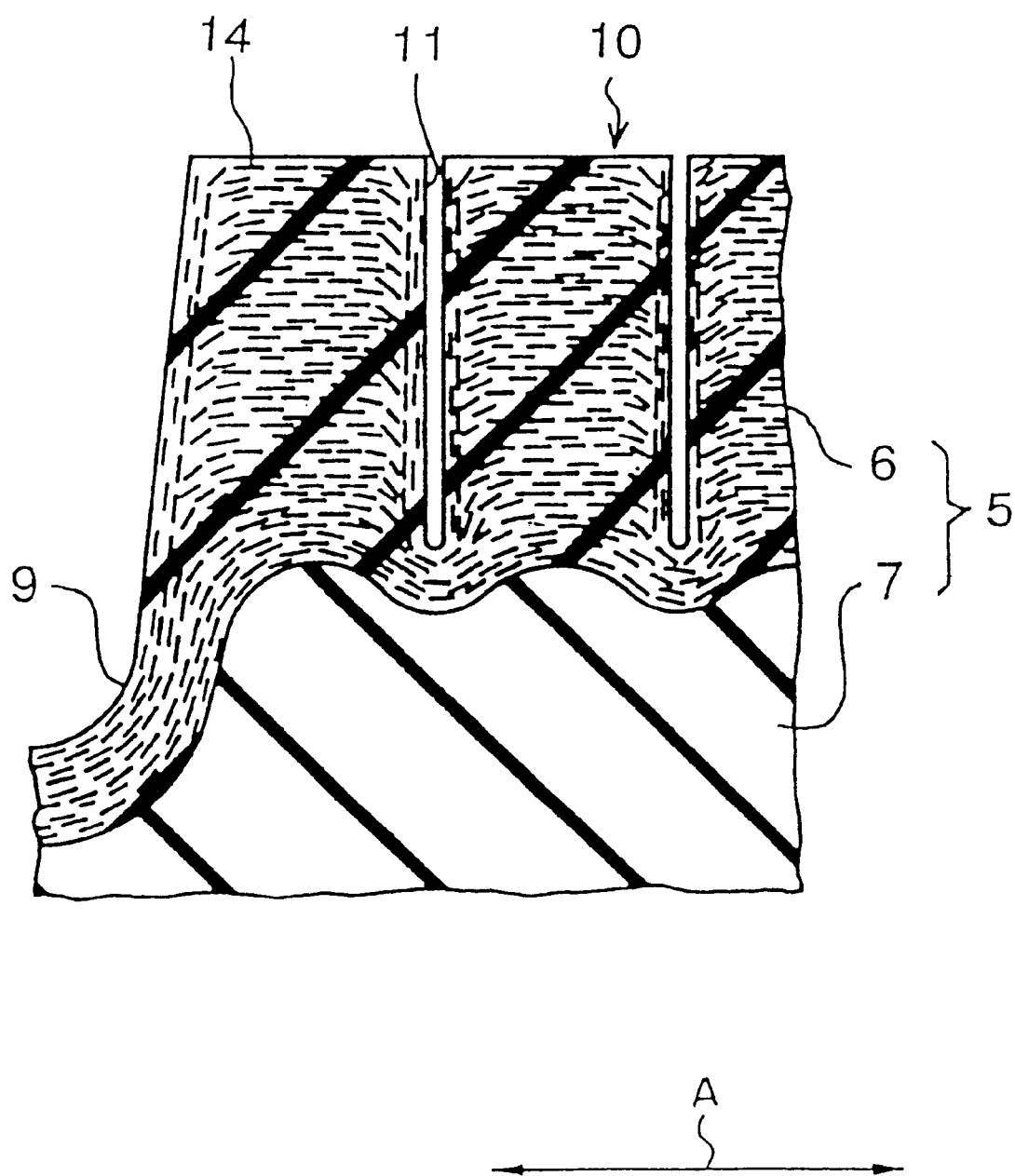
FIG. 5 is a cross sectional schematic explanatory view of a section of the tread of the tire of the present invention.
Figure 7:
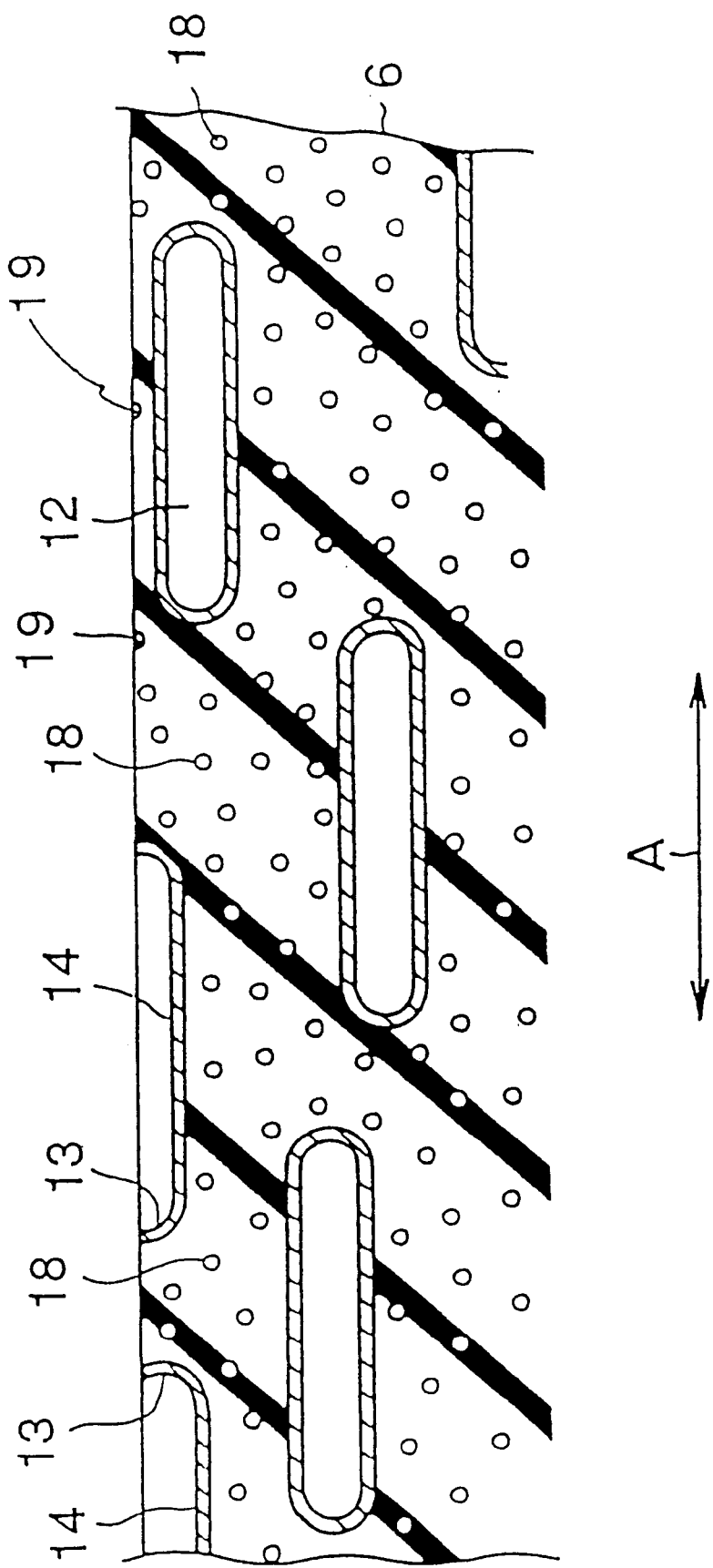
FIG. 7 is an enlarged cross sectional schematic explanatory view of a section of abraded tread of the tire of the present invention.

As shown in FIG. 2, the longitudinal direction of the elongated cells are substantially oriented in the circumferential direction of the tire (the A arrow direction indicated by the arrow in FIGS. 2, 5, and 7, the Y direction in FIG. 4). The surrounding of these cells are reinforced by the protective layer 14 comprising elongated resin.

Tire 4 is manufactured in the following manner, but is not limited to this. At least one rubber component in the rubber composition of the present invention to form the cap section 6 may have a glass transition point of –60° C. or less which is selected from natural rubber or a diene synthetic rubber. This glass transition temperature allows the cap section 6 of the tread 5 to maintain sufficient rubber flexibility and sufficient on-ice performance at low temperatures.

The elongated resin phase is uniformly dispersed in the rubber matrix when the rubber composition is kneaded. The elongated resin phase is composed of a material having a viscosity (melting viscosity) which becomes lower than the rubber matrix viscosity (flow viscosity) before the temperature of the rubber composition reaches its maximum vulcanization temperature in the vulcanization process.

When the rubber matrix 16 containing the phase of the elongated resin 15 is extruded through the mouthpiece of an extruder in which the cross-sectional area of the channel decreases toward the exit, as shown in FIG. 1, the direction of the elongated resin phase, or the lengthwise direction of the elongated resin phase 15 becomes gradually oriented in the direction of extrusion (in the direction of arrow B). When leaving through the mouthpiece, the longitudinal direction of the phase of the elongated resin 15 becomes aligned with the direction of extrusion. The slab-like rubber composition extruded from the mouthpiece can be cut at selected lengths and used as the rubber of the cap section 6.

The cap section 6 of the slab-like unvulcanized rubber composition obtained in this manner is applied on the unvulcanized base section 7 so that the longitudinal direction matches the tire circumference. The unvulcanized base 7 is previously applied to the crown section of the raw tire case (see FIG. 5). The tire 4 can be produced by vulcanizing in a specified mold, at a specified temperature and at a specified pressure.

Figure 6:
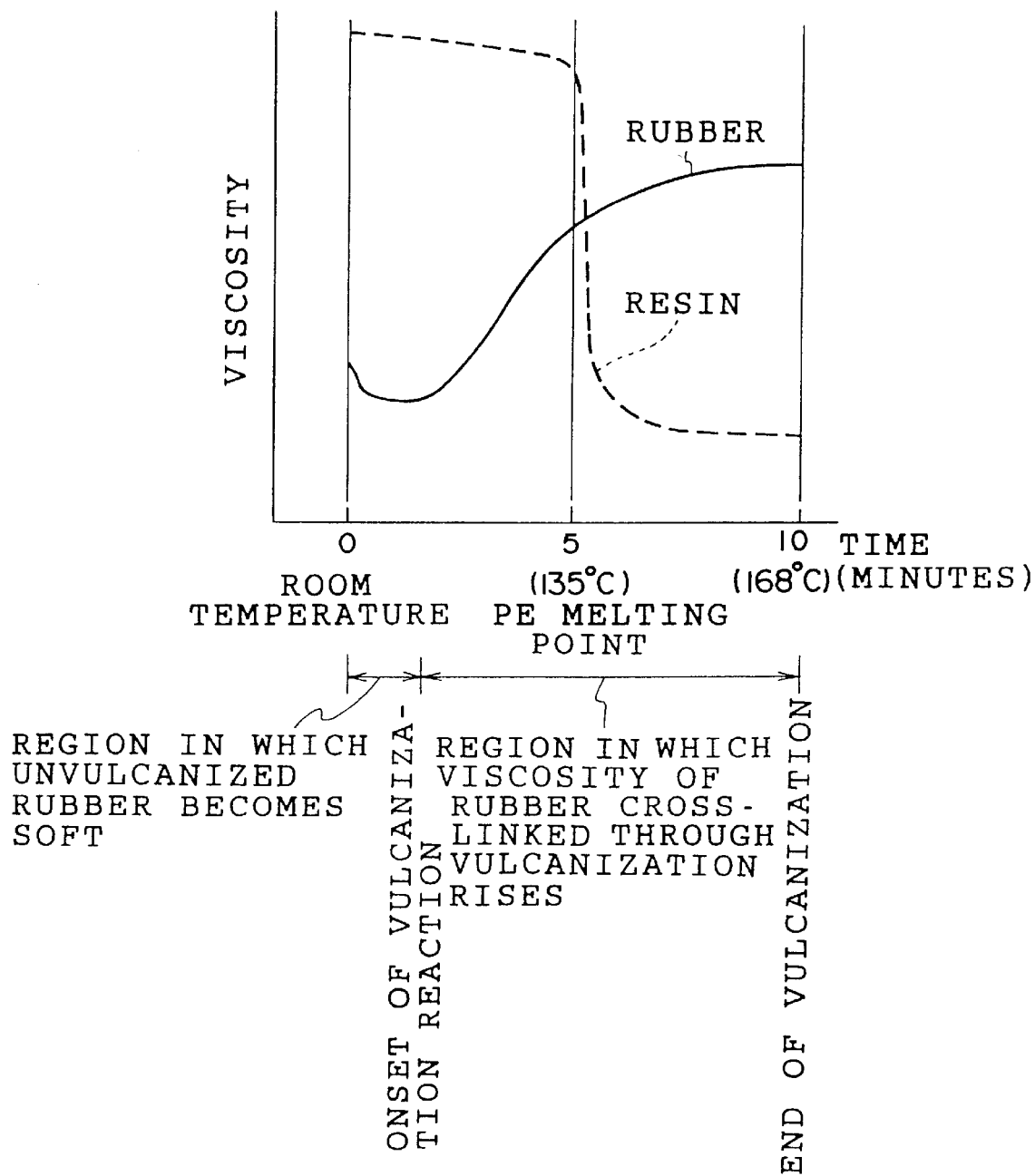
FIG. 6 is a graph demonstrating the relationship between temperature (at the time of vulcanizing) and the viscosity of the rubber matrix and the viscosity of the elongated resin.

At this time, foaming agents in the rubber matrix produce foam and gas when the unvulcanized cap section 6 is heated in the mold. At the same time, the phase of the elongated resin melts (or softens) and its viscosity (melting viscosity) drops below the viscosity (flow viscosity) of the rubber matrix (see FIG. 6). As a result, the gas produced by the foaming agent around the elongated resin phase actually enters the molten elongated resin phase. Once the cap section 6 has been cooled as shown in FIG. 2, the rubber has a high foaming ratio of spherical cells 18, and elongated cells 12. The resultant rubber with high foaming ratio is the vulcanized rubber of the present invention.

There now follows an explanation of the actions of the tire 4. When the tire is set in motion, as seen in FIG. 7, the holes 19 caused by the spherical cells 18 and the elongated channel shaped holes 13 caused by the elongated cells 12 appear at an extremely early stage of wear where the cap section 6 of the tread 5 comes into contact with the road. Under these conditions, when the tires are set in motion on an icy surface, a water film forms between the tires and the icy surface by virtue of the pressure of contact with the road and the heat of friction. However, because of the infinite number of holes 13, 19 formed in the surface of the cap section 6 of the tread 5 in contact with the road, water (water film) on the road surface can be removed quickly.

The elongated holes 13 (channel shaped) with the longitudinal direction thereof lying substantially oriented in the circumferential direction of the tire 4, function as efficient water removing drainage channels. Drainage properties in the grounding surface to drain behind the direction of tire rotation are improved by the elongated holes 13. For this reason, on-ice breaking performance, especially, is improved. In addition, the area around the elongated holes is composed of a material harder than the rubber matrix and having excellent flaking resistance due to the reinforcement offered by the protective layer 14 which itself has excellent flaking resistance. Even under great loads, it is resistant to collapsing, exhibits superior maintenance of channel contours and maintains a high level of drainage at all times. The edge effect arises in the tire 4 because the protective laye[00f8] 14 is exposed to the road contacting surface. This edge effect will improve the coefficient of friction ($\mu$) in a sideways direction and handling on icy roads.

The tread 5 of the tire 4 consists of the vulcanized rubber of the present invention, or is formed by using the rubber composition of the present invention and vulcanizing it. For this reason, the volume proportion of the elongated cells 12 in the tread 5, is higher than the volume proportion of the spherical cells 18.

Because of this, during tire 4 motion, the elongated holes 13 formed by the elongated cells are exposed to the tire 4 surface at a high probability. As a result, drainage by these holes is generally improved, leading to improvements in tire 4 on-ice performance.

Not all elongated cells must be aligned lengthwise in the circumferential direction of the tire 4. It is permissible for some to face a direction other than that of the circumference (see FIG. 5).

The tire of the present invention is for use not only in passenger vehicles. It can be suitably used in all sorts of trucks, buses and the like.

EXAMPLES

The present invention will now be explained by way of example, but is in no way limited by these examples. Examples 1–6 and Comparative Examples 1–9:

The rubber compositions shown in Table 1 were extruded in an extruder and processed. These rubber compositions were vulcanized and made into the vulcanized rubber of tread. Under conventional tire manufacturing conditions and according to conventional practice 185/70R14 size passenger vehicle studless tires (air filled tires) were produced. The tread of these tires was formed with vulcanized rubber.

The structure of the tire is shown in FIG. 3. It consists of a pair of bead sections, a carcass 2 which extends between the pair of bead sections in a toroidal shape, a belt 3 which supports the crown section of the carcass 2, and a tread 5 to form a radial structure.

The carcass 2 is arranged in the tire at an angle of 90° to the circumferential direction of the tire. The code count is 50/5 cm. As shown in FIG. 4, 4 blocks are arranged in the tread 5 of the tire in the direction of the width of the tire. The blocks are 35 mm in the direction of the tire circumference, and 30 mm in the direction of the tire width. The sipings 11 formed by the blocks 10 have a width of 0.4 mm and are placed roughly 7 mm apart in the direction of the tire circumference.

The longitudinal direction of elongated cells is oriented in the tire tread 5 in substantially the circumferential direction of the tire (see arrow A in FIGS. 2, 5 and 7, and the direction of Y in FIG. 4). The surrounding area is reinforced by the protective layer 14 composed of elongated resin.

The average length (L) and diameter (D) of the elongated cells in the tire 4 tread 5 obtained is measured by the following manner.

The average length (L) was calculated as follows: a section of the tread 5 of the tire under examination was taken at a depth of 1 mm from the road contacting surface and in parallel with said surface. The surface cut was then viewed under a light microscope at a magnification of 200 to 400. The greatest lengths in the longitudinal direction of at least 100 elongated cells surrounded by a protective layer composed of resin were measured. The average value was then calculated and taken as the average length (L).

The average diameter was calculated as follows: all tire treads were cut perpendicularly to the circumferential direction of the tire in the direction of depth. The cut surface was viewed under a light microscope at a magnification of 200 to 400. The diameters of at least 100 elongated cells surrounded by a protective layer composed of resin were determined. The average value was calculated to give the average diameter (D).

The foaming ratio of the tread of all the tires obtained was measured by the following manner. A block shaped sample was cut from the tread of each tire and its density $\rho_1$ (g/m$^3$) was measured. At the same time, the density $\rho_0$ of unfoamed rubber (solid rubber) was measured. Then, the foaming ratio was calculated with the following formula:

$$\text{foaming ratio} = (\rho_0/\rho_1 - 1) \times 100 \, (\%).$$

The on-ice properties, wear resistance and wet properties of each tire were determined in the following way. The results are shown in Table 1.

On-ice Properties

On-ice driving properties are expressed by an index of the on-ice braking properties. Each tire was fitted to a Japanese 1800 cc class passenger car. The car was then driven for 1000 kilometers on a flat, smooth, dry test course. Then it was driven on an icy, flat road at an ambient temperature of −2° C. When a speed of 20 Km/h was reached, the driver braked, causing the wheels to lock. The distance taken for the car to come to stop was measured. The results are represented in the next formula as an index.

On-ice property index=(the distance taken to stop in Example 1/the distance taken to stop in the test tire)×100.

The greater the index value is, the better are the on-ice properties.

Wear Resistance

Two tires of each type were fitted to the drive axle of a 1800 cc Japanese passenger car. The car was then driven at a set speed on a flat, smooth, dry test course. The amount of change occurring in the depth of the grooves in each tire was then measured. The larger the index value is, the higher the wear resistance is.

Wet Properties

Each tire was fitted to a Japanese 1800 cc class passenger car. The car was driven in 3 mm of water on a wet concrete road. The brake was applied suddenly with the car running at a speed of 80 Km/h. The distance taken for the car to stop was then measured. The results of the test tires were normalized with a value of 100 for Example 1 to obtain the index values. Wet Properties=(the distance taken to stop in Example 1/the distance taken to stop in each tire)×100. The larger the index value is, the better the wet properties are.

TABLE 1

| | | EXAMPLES | | | | | |
| --- | --- | --- | --- | --- | --- | --- | --- |
| | | 1 | 2 | 3 | 4 | 5 | 6 |
| contents | natural rubber | 60 | 60 | 60 | 30 | 60 | 60 |
| of the mix | cis-1,4-utadienerubber[1] | 40 | 40 | 40 | 70 | 40 | 40 |
| | carbon black[2] | 30 | 30 | 30 | 30 | 30 | 30 |
| | silica[3] | 30 | 30 | 30 | 30 | 30 | 30 |
| (parts | silane coupling agent[4] | 3 | 3 | 3 | 3 | 3 | 3 |
| per | aromatic oils | 10 | 10 | 10 | 10 | 10 | 10 |
| weight) | stearic acid | 2 | 2 | 2 | 2 | 2 | 2 |
| | antioxidant (IPPD)[5] | 2.5 | 2.5 | 2.5 | 2.5 | 2.5 | 2.5 |
| | zinc oxide | 2 | 2 | 2 | 2 | 2 | 2 |
| | vulcanizing accelerator MBTS[6] | 0.6 | 0.6 | 0.6 | 0.6 | 0.6 | 0.6 |
| | vulcanizing accelerator CBS[7] | 1.2 | 1.2 | 1.2 | 1.2 | 2 | 1.2 |
| | sulfur | 1.1 | 1.1 | 1.1 | 1.1 | 1.1 | 1.1 |
| | foaming agent DNPT[8] | 3 | 3 | — | 3 | 3 | 6 |
| | foaming agent ADCA[9] | — | — | 4 | — | — | — |
| | urea | 2.5 | 2.5 | 3 | 2.5 | 2.5 | 5 |
| | polyethylene[10] | 5 | — | 5 | 5 | 10 | 5 |
| | polypropylene[11] | — | 5 | — | — | — | — |
| | polyester[12] | — | — | — | — | — | — |

TABLE 1-continued

| characteristics of elongated cells | av. length L(μm) | 1500 | 1500 | 1500 | 1500 | 1500 | 1500 |
|---|---|---|---|---|---|---|---|
| | av. diameter D(μm) | 120 | 90 | 80 | 120 | 100 | 150 |
| | L/D | 12.5 | 16.7 | 18.8 | 12.5 | 15.0 | 10.0 |
| on-ice performance index (−2° C.) | | 100 | 105 | 107 | 105 | 108 | 103 |
| wear resistance | | 100 | 100 | 99 | 97 | 97 | 98 |
| wet properties | | 100 | 100 | 100 | 97 | 98 | 98 |

| | Comparative Example No. | 1 | 2 | 3 | 4 | 5 | 6 | 7 | 8 | 9 |
|---|---|---|---|---|---|---|---|---|---|---|
| contents of the mix | natural rubber | 60 | 60 | 100 | 60 | 60 | — | 60 | 60 | 60 |
| | cis-1,4polybutadiene rubber[1] | 40 | 40 | — | 40 | 40 | 100 | 40 | 40 | 40 |
| | carbon black[2] | 30 | 30 | 30 | 60 | 30 | 30 | — | 30 | 30 |
| | silica[3] | 30 | 30 | 30 | 30 | 60 | 30 | 30 | — | 30 |
| (parts per weight) | silane coupling agent[4] | 3 | 3 | 3 | 1 | 6 | 3 | 3 | — | 3 |
| | aromatic oils | 10 | 10 | 10 | 10 | 10 | 10 | 10 | 10 | 10 |
| | stearic acid | 2 | 2 | 2 | 2 | 2 | 2 | 2 | 2 | 2 |
| | antioxidant (IPPD)[5] | 2.5 | 2.5 | 2.5 | 2.5 | 2.5 | 2.5 | 2.5 | 2.5 | 2.5 |
| | zinc oxide | 2 | 2 | 2 | 2 | 2 | 2 | 2 | 2 | 2 |
| | vulcanizing accelerator MBTS[6] | 0.6 | 0.6 | 0.6 | 0.6 | 0.6 | 0.6 | 0.6 | 0.6 | 0.6 |
| | vulcanizing accelerator CBS[7] | 1.2 | 1.2 | 1.2 | 1.2 | 1.2 | 1.2 | 1.2 | 1.2 | 1.2 |
| | sulfur | 1.1 | 1.1 | 1.1 | 1.1 | 1.1 | 1.1 | 1.1 | 1.1 | 1.1 |
| | foaming agent DNPT[8] | 3 | 3 | 3 | 3 | 3 | 3 | 3 | 3 | 3 |
| | foaming agent ADCA[9] | | | | | | | | | |
| | urea | 2.5 | 2.5 | 2.5 | 2.5 | 2.5 | 2.5 | 2.5 | 2.5 | 2.5 |
| | polyethylene[10] | — | — | 5 | 5 | 5 | 5 | 5 | 5 | 5 |
| | polypropylene[11] | — | — | — | — | — | — | — | — | — |
| | polyester[12] | — | 6 | — | — | — | — | — | — | — |
| Characteristics of elongated cells | av. length L(μm) | — | — | 1500 | 1500 | 1500 | 1500 | 1500 | 1500 | 156 |
| | av. diameter D(μm) | — | — | 120 | 120 | 120 | 120 | 120 | 120 | 120 |
| | L/D | — | — | 12.5 | 12.5 | 12.5 | 12.5 | 12.5 | 12.5 | 1.3 |
| on-ice performance index (−2° C.) | | 88 | 93 | 95 | 93 | 93 | 104 | 103 | 102 | 91 |
| wear resistance | | 104 | 95 | 102 | 103 | 101 | 90 | 75 | 80 | 100 |
| wet properties | | 103 | 99 | 102 | 103 | 104 | 85 | 85 | 80 | 100 |

[1]Manufactured by Ube Industries, Ltd.: UBEPOL 150L
[2]Manufactured by the Tokai carbon Co., Ltd.: N234
[3]Manufactured by Nippon Silica Ltd.: Nipsil AQ
[4]Manufactured by Degussa Ltd.: Si69
[5]N-isopropyl-N'-phenyl-P-phenylenediamine
[6]dibenzothiazyldisulfide
[7]N-cyclohexyl-2-enzothiazolesulfeneamide
[8]dinitrosopentamethylenetetramine
[9]azodicarbonamide
[10](L) = 2 mm, (D) = 30 μm, melting point = 135° C.
[11](L) = 2 mm, (D) = 30 μm, melting point = 167° C.
[12](L) = 2 mm, (D) = 60 μm, melting point = 260° C.

In Examples 1–6 and Comparative Examples 3–9, the maximum vulcanizing temperature when the rubber composition is vulcanized was measured to be 175° C. by embedding a thermocouple in the rubber composition.

The melting point of the elongated resin in Examples 1–6 and Comparative Examples 3–9 was lower than the maximum vulcanizing temperature of the rubber composition during vulcanization. In Examples 1–6 and Comparative Examples 3–5, the viscosity of the elongated resin fell below the viscosity of the rubber matrix before the rubber composition reaches its maximum vulcanizing temperature (see FIG. 7).

A cone rheometer was used to measure the viscosity (melting viscosity) of the elongated resin at the maximum vulcanizing temperature in Examples 1–6 and Comparative Examples 3–9, and found to be 6. From an initial temperature of 190° C., the temperature was reduced 5° C. at a time and the torque measured. This torque was taken to be the viscosity of the elongated resin and the temperature dependency of the viscosity was measured. Then, viscosity of the elongated resin at the maximum vulcanizing temperature was extrapolated from the curve plotted, and compared with the viscosity of the rubber matrix. Except the temperature, the viscosity determination and the conditions of the rubber matrix were the same.

A 1-C type cone rheometer produced by Monsant Ltd. was used in Examples 1–6 and Comparative Examples 3–9 to measure that the viscosity (flow viscosity) of the rubber matrix at maximum vulcanizing temperature was 13. While altering the temperature, a predetermined amplitude was periodically applied at 100 cycles per minute. The torque was determined. The smallest torque value measured was taken to be the viscosity (dome pressure 8.0 Kg/cm$^2$, closing pressure 8.0 Kg/cm$^2$, angle of oscillation±5°).

It is clear from Tables 1 and 2 that the Examples fulfill conditions according to the present invention, while the Comparative Examples do not. To be specific, Comparative Examples 1 and 2 do not have elongated cells (in the case of Comparative Example 2, the resin does not melt during vulcanization, so elongated cells are not formed). Comparative Example 3 does not employ polybutadiene rubber, and Comparative Example 4 contains more than 55 parts of carbon black per 100 parts of rubber component. Comparative Example 5 contains more than 55 parts of silica, Comparative Example 6 does not employ natural rubber, and Comparative Example 7 does not employ carbon black. Comparative Example 8 does not employ silica, and Comparative Example 9 has the above ratio (L/D) at less than 3 in the elongated cells. In each case, it is clear that balanced improvements in on-ice performance, wet properties and wear resistance are not achieved.

What is claimed is:

1. Vulcanized rubber comprising a rubber matrix and elongated cells, wherein said rubber matrix comprises i) a rubber component containing 20 to 70 parts by weight of natural rubber and 30 to 80 parts by weight of polybutadiene rubber, ii) 5 to 55 parts by weight of carbon black per 100 parts by weight of the rubber component, and iii) 5 to 55 parts by weight of silica per 100 parts by weight of the rubber component, and wherein said elongated cells are closed and completely coated with a resin layer and have a ratio (L/D) of an average length (L) to average diameter (D) of at least 3.

2. The vulcanized rubber according to claim 1 wherein a total average foaming ratio, which is an average foaming ratio of spherical closed cells plus an average foaming ratio of said elongated cells, is from 3 to 40%.

3. The vulcanized rubber according to claim 1, wherein the resin layer comprises at least one compound selected from the group consisting of polyolefin and polyolefin copolymers.

4. The vulcanized rubber according to claim 1, wherein the resin layer comprises at least one compound selected from the group consisting of polyethylene and polypropylene.

5. The vulcanized rubber according to claim 1, wherein the rubber matrix further comprises at least one inorganic filling material.

6. The vulcanized rubber according to claim 5, wherein the inorganic filling material is at least one material selected from the group consisting of $Al_2O_3$, ZnO, $TiO_2$, SiC, Si, C, $SiO_2$, ferrite, zirconia, MgO, Fe, Co, Al, Ca, Mg, Na, Cu, Cr, nitrides, oxides, hydroxides, carbonates, silicates, sulfates and alloys composed of metals selected from the group consisting of Fe, Co, Al, Ca, Mg, Na, Cu, and Cr, brass, stainless steel, glass, carbon, carbon random, mica, zeolite, kaolin, asbestos, montmorillonite, bentonite, graphite and clay.

7. The vulcanized rubber according to claim 1, wherein the average length (L) is at least 500 $\mu$m.

8. The vulcanized rubber according to claim 1, wherein the ratio (L/D) is not smaller than 10.

9. A tire comprising:

a pair of bead sections;

a carcass which extends between the pair of bead sections and is formed in a toroidal shape;

a belt which reinforces the crown of said carcass; and a tread, wherein the tread contains a vulcanized rubber comprising a rubber matrix and elongated cells, wherein said rubber matrix comprises i) a rubber component containing 20 to 70 parts by weight of natural rubber and 30 to 80 parts by weight of polybutadiene rubber, ii) 5 to 55 parts by weight of carbon black per 100 parts by weight of the rubber component, and iii) 5 to 55 parts by weight of silica per 100 parts by weight of the rubber component, and wherein said elongated cells are closed and completely coated with a resin layer and have a ratio (L/D) of average length (L) to average diameter (D) of at least 3.

10. The tire according to claim 9 wherein the elongated cells are oriented along the circumferential direction of the tire.

* * * * *